United States Patent
LeFlohic et al.

(10) Patent No.: US 11,023,924 B1
(45) Date of Patent: Jun. 1, 2021

(54) EVENT TRIGGERS IN AUDIO ADVERTISING

(71) Applicant: Jelli, Inc., San Mateo, CA (US)

(72) Inventors: John Paul LeFlohic, San Mateo, CA (US); Sreeharsha Kamireddy, Danville, CA (US)

(73) Assignee: Jelli, Inc., San Mateo, CA (US)

( * ) Notice: Subject to any disclaimer, the term of this patent is extended or adjusted under 35 U.S.C. 154(b) by 0 days.

(21) Appl. No.: 15/474,957

(22) Filed: Mar. 30, 2017

Related U.S. Application Data

(60) Provisional application No. 62/317,373, filed on Apr. 1, 2016.

(51) Int. Cl.
*G06Q 30/02* (2012.01)

(52) U.S. Cl.
CPC ..... *G06Q 30/0252* (2013.01); *G06Q 30/0273* (2013.01); *G06Q 30/0277* (2013.01)

(58) Field of Classification Search
CPC .......... G06Q 30/0252; G06Q 30/0273; G06Q 30/0277
USPC ................... 705/14.51, 6; 725/22
See application file for complete search history.

(56) References Cited

U.S. PATENT DOCUMENTS

| | | | | |
|---|---|---|---|---|
| 2005/0216339 A1* | 9/2005 | Brazell | .................. | G06Q 30/02 705/14.52 |
| 2007/0039018 A1* | 2/2007 | Saslow | .................. | G06Q 30/02 725/22 |
| 2009/0006145 A1* | 1/2009 | Duggal | ................ | G06Q 10/025 705/6 |
| 2009/0313120 A1* | 12/2009 | Ketchum | ............... | G06Q 30/02 705/14.51 |
| 2012/0166289 A1* | 6/2012 | Gadoury | ............ | G06Q 30/0269 705/14.66 |

OTHER PUBLICATIONS

"Why Use a Container Sidecar for Microservices?", Daniel Bryant, http://www.voxxed.com/2015/01/use-container-sidecar-microservices/ (Year: 2015).*
Marketing Spot Optimization An IP.com Prior Art Database Technical Disclosure Authors et. al.: Disclosed Anonymously IP.com Electronic Publication Date: Jul. 19, 2013 (Year: 2013).*

* cited by examiner

*Primary Examiner* — Alexandru Cirnu
(74) *Attorney, Agent, or Firm* — Van Pelt, Yi & James LLP

(57) ABSTRACT

One or more event trigger rules is stored, each event trigger rule including a trigger condition and a corresponding action. An indication is received that the trigger condition associated with a triggered event trigger rule has been satisfied. The corresponding action associated with the triggered event trigger rule is performed, based at least in part on the indication, wherein the corresponding action comprises a behavior associated with an audio advertising campaign.

16 Claims, 28 Drawing Sheets

| SpotPlan™ | Plans | Proposals | Campaigns | | 🚀 Jelli | John Mitchell Network Manager |
|---|---|---|---|---|---|---|

Campaigns > ADT . 1134: May - June > Rotations

Optima Hybrid Launch Das Auto - Ad Infinitum
5/4/2015 - 6/28/2015   BUY   NIELSEN RATINGS   DEMO   IMPRESSIONS   GRPs   BUDGET
                            Spring 2014    Persons 18-49  2,413.1K    3.838   $12,153.35

| BUDGET | GRP | CPP | IMPRESSIONS | CPM | EXPECTED COMPLIANCE |
|---|---|---|---|---|---|
| $12,153.35 | 3.838 | $3,166 | 2,413.1K | $5.04 | 100.00% |

[Action ▾]

Details | Plans | Targets | Creatives | Event rules | Rotations

[Cancel] [Save]

Rotations

| Flight | Targeting | Dayparts | Event rules | Creatives | Weight |
|---|---|---|---|---|---|
| 5/4/2015 - 6/28/2015 | Use wizard to select stations + | mo-fri 5a-8p | All ▾ | Select creative ▾ | |

FIG. 7D

Rotation Targets  ✕

Format | Market | Stations | Summary    [Search]  ⦿ [Search All Fields ▾]

[Search 🔍]                              [Exclude All] [Include All]

| Market | State | Rank | Station # |
|---|---|---|---|
| New York | NY | 1 | 20 |
| Chicago, IL | IL | 3 | 8 |
| Philadelphia, PA | PA | 4 | 23 |
| Dallas Ft. Worth, TX | TX | 5 | 7 |
| San Francisco-Oakland-San Jose, CA | CA | 6 | 12 |
| Boston (Manchester), MA | MA | 7 | 22 |
| Washington, DC (Hagrstwn) | DC | 8 | 13 |
| ~~Minneapolis St. Paul, MN~~ | ~~MN~~ | ~~15~~ | ~~12~~ |
| ~~Denver, CO~~ | ~~CO~~ | ~~17~~ | ~~22~~ |
| ~~Cleveland-Akron (Canton), OH~~ | ~~OH~~ | ~~19~~ | ~~17~~ |
| ~~Sacramento-Stockton-Modesto, CA~~ | ~~CA~~ | ~~20~~ | ~~17~~ |

[Cancel] [Revert] [Save]

| Rotations | | | | | |
|---|---|---|---|---|---|
| Flight | Targeting | Dayparts | Event Rules | Creatives | Weight |
| 5/4/2015 - 6/28/2015 | 7 Markets 6 Formats 30 Stations | mo-fri 6a-7p | All / Allergy / Cold Season | Select creative | |

FIG. 7K

| Rotations | | | | | |
|---|---|---|---|---|---|
| Flight | Targeting | Dayparts | Event Rules | Creatives | Weight |
| 5/4/2015 - 6/28/2015 | 7 Markets 6 Formats 30 Stations | Mo-fri 6a-7p | Allergy ✕ / All other | Select creative / Select creative | |

| SpotPlan™ | Plans | Proposals | Campaigns | | Jelli | John Mitchell Network Manager |

Campaigns > ADT. 1134: May - June > Rotations

Optima Hybrid Launch Das Auto - Ad Infinitum
5/4/2015 - 6/28/2015  BUY  NIELSEN RATINGS  DEMO  IMPRESSIONS  GRPs  BUDGET
                      Spring 2014  Persons 18-49  2,413.1K  3.838  $12,153.35

| BUDGET | GRP | CPP | IMPRESSIONS | CPM | EXPECTED COMPLIANCE | Action ▼ |
| $12,153.35 | 3.838 | $3,166 | 2,413.1K | $5.04 | 100.00% | |

Details  Plans  Targets  Creatives  Event rules  Rotations

Cancel  Save

Rotations

| Flight | Targeting | Dayparts | Event Rules | Creatives | Weight |
|---|---|---|---|---|---|
| 5/4/2015 - 6/28/2015 | 7 Markets 6 Formats 30 Stations | mo-Fri 6a-7p | Allergy ▼ ✕ | Select Creative ▼ | |
| | | | Cold Season ▼ ✕ | Select Creative ▼ | |
| | | | All Other ▼ | Select Creative ▼ | |

| SpotPlan™ | Plans | Proposals | Campaigns | | Jelli | John Mitchell Network Manager |

Campaigns > ADT. 1134: May - June > Rotations

Optima Hybrid Launch Das Auto - Ad Infinitum
5/4/2015 - 6/28/2015  BUY  NIELSEN RATINGS  DEMO  IMPRESSIONS  GRPs  BUDGET
                      Spring 2014  Persons 18-49  2,413.1K  3.838  $12,153.35

| BUDGET | GRP | CPP | IMPRESSIONS | CPM | EXPECTED COMPLIANCE | Action ▼ |
| $12,153.35 | 3.838 | $3,166 | 2,413.1K | $5.04 | 100.00% | |

Details  Plans  Targets  Creatives  Event rules  Rotations

Cancel  Save

Rotations

| Flight | Targeting | Dayparts | Event Rules | Creatives | Weight |
|---|---|---|---|---|---|
| 5/4/2015 - 6/28/2015 | 7 Markets 6 Formats 30 Stations | mo-fri 6a-7p | Allergy ▼ | Optima Hybrid Launch 1 [DATO68995] ▼ ✕ | 50 |
| | | | | Optima Hybrid Launch 2 [DATO68997] ▼ ✕ | 50 |
| | | | | + | |
| | | | Cold Season ▼ | Select creative ▼ | |
| | | | All other ▼ | Select creative ▼ | |

FIG. 7M

| SpotPlan™ | Plans | Proposals | Campaigns | | 🚀 Jelli | John Mitchell Network Manager ⚙ | |

Campaigns > ADT . 1134: May - June > Rotations

Optima Hybrid Launch Das Auto - Ad Infinitum
5/4/2015 - 6/28/2015    BUY   NIELSEN RATINGS   DEMO    IMPRESSIONS   GRPs   BUDGET
                                     Spring 2014     Persons 18-49   2,413.1K     3.838   $12,153.35

| BUDGET | GRP | CPP | IMPRESSIONS | CPM | EXPECTED COMPLIANCE | Action ▾ |
|---|---|---|---|---|---|---|
| $12,153.35 | 3.838 | $3,166 | 2,413.1K | $5.04 | 100.00% | |

Details   Plans   Targets   Creatives   Event rules   Rotations

[Cancel] [Save]

Rotations

| Flight | Targeting | Dayparts | Event Rules | Creatives | Weight |
|---|---|---|---|---|---|
| 5/4/2015 - 6/28/2015 | 7 Markets 6 Formats 30 Stations | mo-fri 6a-7p | Allergy ▾ | Optima Hybrid Launch 1 [DATO68995] ▾ | 50 |
| | | | | Optima Hybrid Launch 2 [DATO68997] ▾ | 50 |
| | | | Cold Season ▾ | Select creative ▾ | |
| | | | All other ▾ | Select creative ▾ | |
| +   ✕ | | | | | |

| SpotPlan™ | Plans | Proposals | Campaigns | | 🚀 Jelli | John Mitchell Network Manager ⚙ |

Campaigns > ADT . 1134: May - June > Rotations

Optima Hybrid Launch Das Auto - Ad Infinitum
5/4/2015 - 6/28/2015    BUY  NIELSEN RATINGS   DEMO           IMPRESSIONS  GRPs   BUDGET
                              Spring 2014       Persons 18-49  2,413.1K     3.838  $12,153.35

| BUDGET | GRP | CPP | IMPRESSIONS | CPM | EXPECTED COMPLIANCE | |
|---|---|---|---|---|---|---|
| $12,153.35 | 3.838 | $3,166 | 2,413.1K | $5.04 | 100.00% | [Action ▾] |

Details  Plans  Targets  Creatives  Event rules  Rotations

[Cancel] [Save]

Rotations

| Flight | Targeting | Dayparts | Event Rules | Creatives | Weight |
|---|---|---|---|---|---|
| *This change will affect a live campaign.* | | | | | |
| 5/18/2015 - 6/28/2015 | 7 Markets 6 Formats 30 Stations | mo-fri 6a-7p | Allergy ▾ | Optima Hybrid Launch 1 [DATO68995] ▾ | 50 |
| | | | | Optima Hybrid Launch 2 [DATO68997] ▾ | 50 |
| | | | Cold Season ▾ | Select creative ▾ | |
| | | | All other ▾ | Select creative ▾ | |
| + | | | | | |

FIG. 7Q

| SpotPlan™ | Plans | Proposals | Campaigns | | 🚀 Jelli | John Mitchell ⚙ |
|---|---|---|---|---|---|---|

Campaigns > ADT . 1134: May - June > Rotations

Optima Hybrid Launch Das Auto - Ad Infinitum
5/4/2015 - 6/28/2015　　BUY　NIELSEN RATINGS　DEMO　　　　IMPRESSIONS　GRPs　BUDGET
　　　　　　　　　　　　　　　Spring 2014　Persons 18-49　2,413.1K　　3.838　$12,153.35

| BUDGET | GRP | CPP | IMPRESSIONS | CPM | EXPECTED COMPLIANCE | |
|---|---|---|---|---|---|---|
| $12,153.35 | 3.838 | $3,166 | 2,413.1K | $5.04 | 100.00% | Action ▾ |

| Details | Plans | Targets | Creatives | Event rules | Rotations |
|---|---|---|---|---|---|

[Cancel] [Save]

Rotations

| Flight | Targeting | Dayparts | Event Rules | Creatives | Weight |
|---|---|---|---|---|---|
| Warning: Plan dayparts are not fully covered by ad rotations. Please resolve before flight launch. (see more) | | | | | |
| 5/18/2015 - 6/28/2015 | 7 Markets 6 Formats 30 Stations | mo-fri 6a-7p | Allergy ▾ | Optima Hybrid Launch 1 [DATO68995] ▾ | 50 |
| | | | | Optima Hybrid Launch 2 [DATO68997] ▾ | 50 |
| | | | Cold Season ▾ | Select creative ▾ | |
| | | | All other ▾ | Select creative ▾ | |
| ＋ | | | | | |

Campaigns > 0078

Das Auto - Truth in Engineering (0078)
Monday, March 16, 2015 - Sunday, October 11, 2015
Delivered by: Jelli Ad Network BUY: Nielsen Ratings Fall 2013 | Demo: Persons 25-54 | Impressions: 13.2M | GRPs: 10.50 | Budget: $94,474

| CAMPAIGNS | IMPRESSIONS DELIVERED |
|---|---|
| 45.0% | 6,482.1K |

Last updated: Wednesday, May 27, 2015 09.59 AM

| Impressions | | | |
|---|---|---|---|
| | Ordered | Aired | |
| | 14.4M | 6.613.0K | 45.9% |
| Paid | 14.4M | 6.613.0K | 45.9% |
| Bonus | - | - | - |
| Make Good | - | - | - |

Show weeks»

| GRPs | | | |
|---|---|---|---|
| | Ordered | Aired | |
| | 11.422 | 5.242 | 45.9% |
| Paid | 11.422 | 5.242 | 45.9% |
| Bonus | - | - | - |
| Make Good | - | - | - |

Show weeks»

Spots
Last played: 30 minutes ago
KOIT-FM
Spring Sales Event 1
Show ad plays »

| Impressions by Event | |
|---|---|
| Event | % |
| Allergy | 9.2% |
| Cold Season | 72.5% |
| All other | 18.3% |

Show event rules»

Markets
Show all markets »

FIG. 8B

Radio Dash™ | John Mitchell, Network Manager

Campaigns > 0078

Das Auto - Truth in Engineering (0078)
Monday, March 16, 2015 - Sunday, October 11, 2015
Delivered by: Jelli Ad Network BUY: Nielsen Ratings Fall 2013 | Demo: Persons 25-54 | Impressions: 13.2M | GRPs: 10.50 | Budget: $94,474

TOTAL AD PLAYS
8,456

☐ spot aired correctly and metrics have been processed    ☐ spot aired recently and metrics are pending    ☐ spot aired with error (see notes for details)    Show event rules

| ADVERTISER | AGENCY | CREATIVE | ISCI | Event | PLAY TIME | STATION | MARKET | STATUS |
|---|---|---|---|---|---|---|---|---|
| Das Auto | Ad Infinitum | Truth in Engineering 1 | ▷DATO68997 | Allergy | Sun 09/27/15 6:43 PM US Hawaii | KHJZ-FM | Honolulu, Hi | OK |
| Das Auto | Ad Infinitum | Truth in Engineering 1 | ▷DATO68997 | Cold Season | Sun 09/27/15 6:43 PM US Hawaii | KHJZ-FM | Tucson (Sierra Vista), AZ | OK |
| Das Auto | Ad Infinitum | Truth in Engineering 1 | ▷DATO68999 | Cold Season | Sun 09/27/15 6:43 PM US Hawaii | KHJZ-FM | Grand Junction-Montrose, CO | OK |
| Das Auto | Ad Infinitum | Truth in Engineering 1 | ▷DATO68999 | Cold Season | Sun 09/27/15 6:43 PM US Hawaii | KHJZ-FM | Salt Lake City, UT | OK |
| Das Auto | Ad Infinitum | Truth in Engineering 1 | ▷DATO68997 | All Other | Sun 09/27/15 6:43 PM US Hawaii | KHJZ-FM | Denver, CO | OK |
| Das Auto | Ad Infinitum | Truth in Engineering 1 | ▷DATO68997 | Cold Season | Sun 09/27/15 6:43 PM US Hawaii | KHJZ-FM | Tucson (Sierra Vista), AZ | OK |
| Das Auto | Ad Infinitum | Truth in Engineering 1 | ▷DATO68999 | Allergy | Sun 09/27/15 6:43 PM US Hawaii | KHJZ-FM | Champaign & Springfield-Decatur, IL. | OK |

EVENT TRIGGERS IN AUDIO ADVERTISING

CROSS REFERENCE TO OTHER APPLICATIONS

This application claims priority to U.S. Provisional Patent Application No. 62/317,373 entitled EVENT TRIGGERS IN LINEAR BROADCAST ADVERTISING filed Apr. 1, 2016 which is incorporated herein by reference for all purposes.

BACKGROUND OF THE INVENTION

Modern retail media consumption includes source media from linear broadcast and online networks. Linear broadcast media includes broadcast radio, wherein a consumer has no individual control over the content being consumed or the order presented. By contrast on-demand audio, primarily embodied by online radio, gives the consumer varying degrees of individual control.

Linear broadcast networks and online networks such as those in radio and television offer advertising spots to finance operations. The term 'inventory' refers to the openings of advertising spots for an advertiser to place ads into. Audio is consumed often in cars or at the office. Improving context of audio advertising may provide benefits to both advertisers and publishers of advertising spots.

BRIEF DESCRIPTION OF THE DRAWINGS

Various embodiments of the invention are disclosed in the following detailed description and the accompanying drawings.

FIGS. 5A-5I are user interface screenshots illustrating a storyboard for creating or adding an event rule.

FIGS. 8A-8C are user interface screenshots illustrating a storyboard for reporting an event.

FIG. 9 is an illustration of events pacing.

DETAILED DESCRIPTION

Figure 1:
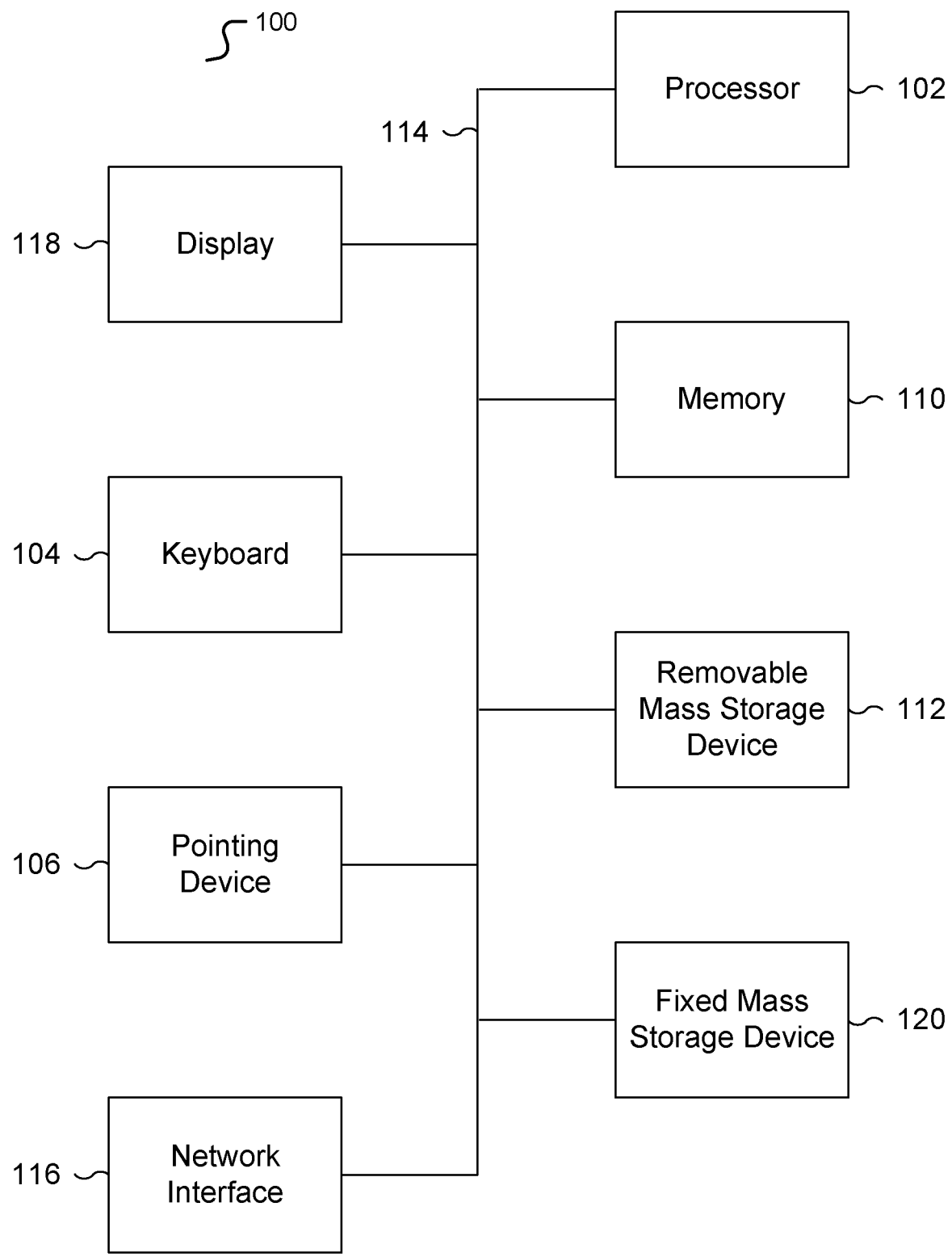
FIG. 1 is a functional diagram illustrating a programmed computer/server system for processing audience data in audio advertising in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Due perhaps in part to the legacy nature of linear broadcast and the still early development of online audio services, audio advertising may have complicated business sales channels that do not match with modern methods used in online. Consumers digest audio often at home, work, or commuting between the two. A reasonable simplified assumption in advertising is that a consumer's wants and/or needs are at least partially determined by public events and/or situations, such as weather, sports, politics, news, and other current events.

For example, when pollen counts are high may be when allergy sufferers may want to be reminded about anti-allergy medications they could buy. Accordingly, the advertiser, or agency representing them, may want to customize their campaign to these events, and in real time. They may customize which version of the ad is played to match the events; or, events could control when the advertising campaign is played out in the first place and at what pacing and/or density it is played out.

Similarly, an advertiser may wish to adjust an advertising campaign based on non-public events such as sales figures or other advertising response metrics. While some events, such as the weather, are independent of the campaign and are not affected by the sales campaign, other events, such as regional sales figures, are at least partially dependent on the campaign. Dependent events, such as sales rates, may be harnessed as a real-time feedback loop. By adding an online real-time feed of such events into the campaign-delivery process, many valuable opportunities may be unlocked for an advertiser.

For example, a campaign may be delivered to more precisely the regions and demographics where sales is currently lacking. Moreover, the delivery of the campaign may be turned off when it has reached maximum effect, as measured by changes in sales. Similarly, the campaign may be automatically turned back on where sales has fallen below usual levels over time. This automatic adaptive delivery of campaigns may save dramatically on advertising cost and may also avoid listeners hearing the ad so many times that it becomes less motivating and more irritating, termed "over-saturation". It may also dramatically increases the timeliness of advertising; with no personnel overhead and without having to wait for, say, monthly sales reports, the campaign may be very targeted to just where it is needed and just when it is needed.

Another example use of real-time feedback includes switching which ad to play based on which products have lower than usual sales. This may be of interest for large retail advertisers who have many categories of products for sale. As an example of using events to control the pacing of a campaign, the campaign may be played with high density when it is producing a large increase in sales; then, as the sales increase rate starts to taper off, the campaign may be played with low density, serving more as an occasional reminder.

It is an improvement to trigger audio advertising based on one or more of these consumer and/or publisher events. Event-based delivery of campaigns may unlock a dramatic improvement of return on investment (ROI) that was previously unavailable to the industry due at least in part to a lack of a computerized ad delivery system with automated adaptation to the events gathered in real-time throughout the country.

Event triggers for audio advertising is disclosed. Event triggers may be used to select creative copy, that is the audio played out, for an ad spot. Event triggers may be used to control when a campaign is played out or when it is not and/or to control the pacing with which the campaign is delivered. An example of an event trigger is a weather event trigger, political event trigger, sports event triggers, news event triggers, sales volume triggers, audience response triggers, entertainment event triggers, traffic event triggers, and holiday/seasonal event triggers. For example, embodiments of dynamic event triggers include/use real time event based audio creative selection, real time event based campaign activation, and real time feedback based on sales or other external metrics.

In one embodiment, event triggers are handled programmatically, that is automatically, online, algorithmically, and in a pre-configured way, across stations and markets with corresponding action including changing ad copy and/or activating/deactivating campaigns and/or altering playout pacing/density. In one embodiment, event-based campaigns are optimally planned into regions and time periods based at least in part on how often and/or for what duration the events the campaign is sensitive to will be true. In one embodiment, event triggers are not blanketed across the country/all markets in real time, but instead audio creative can change station by station, or campaigns may activate or deactivate at a station/venue level of granularity.

In one embodiment, event-based campaigns may be handled in a unified way with standard non-event-based campaigns, so that both types of campaign may be delivered via the same shared pipeline/process to the stations/venues. Each campaign may comprise allocations, each of which is a single ad play that has been placed/planned into a certain station and daypart. While a standard campaign's allocations may always play out, an event-based campaign's allocations only may have a certain probability of playing out, based on predictions of the event conditions at that time and place. Thus, a large part of the algorithm/process may involve creating predictions, making proper use of them, and then adapting over time as event conditions actually come true.

As a simplified example of making use of predictions, if all allocations have only a 50% chance of playing, then twice as many allocations into the campaign must be planned. That is done to be sure it is likely to meet the campaign's impressions goal. Predictions may have an error bar between the prediction of event results and the actual event results; conditions may end up true less often than predicted. In one embodiment, to cope with that risk, campaigns are slightly over-allocated such that the probability of still under-delivering the campaign becomes negligible. Moreover, once the campaign reaches its impressions goal, any remaining allocations may be removed quickly as they will not need to be played after all. Overall, this algorithm is termed "Over-allocation with Adaptive Cut-off". Cutting off is critical, since actual overplays would result in the publisher/station being owed money that the advertiser did not commit to paying. Note that the amount for over-allocation may sometimes be quite small due to the law of large numbers. For example, it is hard to predict with much accuracy the number of hours it will rain in a certain city over a three-week period; it may rain significantly more or less. However, when doing the same measure over thousands of cities throughout the country, the result may be much more accurate since the actual conditions average out with each other. This may especially be the case with rain as moisture that bypasses one city may drop instead in the next city.

In one embodiment, a "Situational Sales Stabilization" algorithm uses a closed-loop feedback source that may become an event trigger, including, but not limited to, at least one of the following: political campaigns, product sales volumes or other sales metrics, advertising response metrics such as impressions or activations, and product awareness— via direct polls or proxy measures.

Any person having ordinary skill in the art may recognize that while certain examples are given throughout this specification for radio broadcast networks and/or stations, online streaming, and corresponding audio media, without loss of generality the same principles and disclosed techniques may be applied to television broadcast networks and/or stations and corresponding video media. Without loss of generality throughout this specification "broadcasting" refers generally to the distribution of audio, video, and/or multimedia content in a one-to-many model via any electronic mass communications medium or combination of media including electromagnetic spectrum, over the air/terrestrial media, cable/coaxial/wired media, satellite transmission media, and/or computer readable media.

Thus, throughout this specification, "media" may refer to any form of information transmission, for example audio, video, radio, television, other communication using electromagnetic waves, cable, and/or computer transmissions. Throughout this specification, "users" refer to any consumers of the content, including listeners and viewers of the content. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, and broadcast over twisted pair cable. The example of radio is given now, but these principles may be applied for example to television similarly.

FIG. 1 is a functional diagram illustrating a programmed computer/server system for processing audience data in audio advertising in accordance with some embodiments. As shown, FIG. 1 provides a functional diagram of a general purpose computer system programmed to provide audience data processing in accordance with some embodiments. As will be apparent, other computer system architectures and configurations may be used for audience data processing.

Computer system (100), which includes various subsystems as described below, includes at least one microprocessor subsystem, also referred to as a processor or a central processing unit ("CPU") (102). For example, processor (102) may be implemented by a single-chip processor or by multiple cores and/or processors or by virtual processors. In some embodiments, processor (102) is a general purpose digital processor that controls the operation of the computer system (100). Using instructions retrieved from memory (110), the processor (102) controls the reception and manipulation of input data, and the output of data on output devices, for example network interface (116) or storage (120).

Processor (102) is coupled bi-directionally with memory (110), which may include a first primary storage, typically a random-access memory ("RAM"), and a second primary storage area, typically a read-only memory ("ROM"). As is well known in the art, primary storage may be used as a general storage area and as scratch-pad memory, and may also be used to store input data and processed data. Primary storage may also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) may include any suitable computer-readable storage media, described below, depending on whether, for example, data access needs to be bi-directional or uni-directional. For example, processor (102) may also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system (100), and is coupled either bi-directionally (read/write) or uni-directionally (read only) to processor (102). For example, storage (112) may also include computer-readable media such as flash memory, portable mass storage devices, holographic storage devices, magnetic devices, magneto-optical devices, optical devices, and other storage devices. A fixed mass storage (120) may also, for example, provide additional data storage capacity. The most common example of mass storage (120) is an eMMC device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) may be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a network interface (116), a keyboard and/or pointing device (104), as well as an auxiliary input/output device (106) interface, a sound card, microphone speakers, and other subsystems as needed. For example, the pointing device (104) can be a mouse, stylus, track ball, touch display, and/or tablet, and is useful for interacting with a graphical user interface.

The communication interface (116) allows processor (102) to be coupled to another computer, computer network, or telecommunications network using a network connection as shown. For example, through the communication interface (116), the processor (102) may receive information, for example data objects or program instructions, from another network, or output information to another network in the course of performing method/process steps. Information, often represented as a sequence of instructions to be executed on a processor, may be received from and outputted to another network. An interface card or similar device and appropriate software implemented by, for example executed/performed on, processor (102) may be used to connect the computer system (100) to an external network and transfer data according to standard protocols. For example, various process embodiments disclosed herein may be executed on processor (102), or may be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, may also be connected to processor (102) through communication interface (116).

In addition, various embodiments disclosed herein further relate to computer storage products with a computer readable medium that includes program code for performing various computer-implemented operations. The computer-readable medium is any data storage device that may store data which may thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that may be executed using an interpreter.

The computer/server system shown in FIG. 1 is but an example of a computer system suitable for use with the various embodiments disclosed herein. Other computer systems suitable for such use may include additional or fewer subsystems. In addition, bus (114) is illustrative of any interconnection scheme serving to link the subsystems. Other computer architectures having different configurations of subsystems may also be utilized, including virtual servers.

Figure 2:
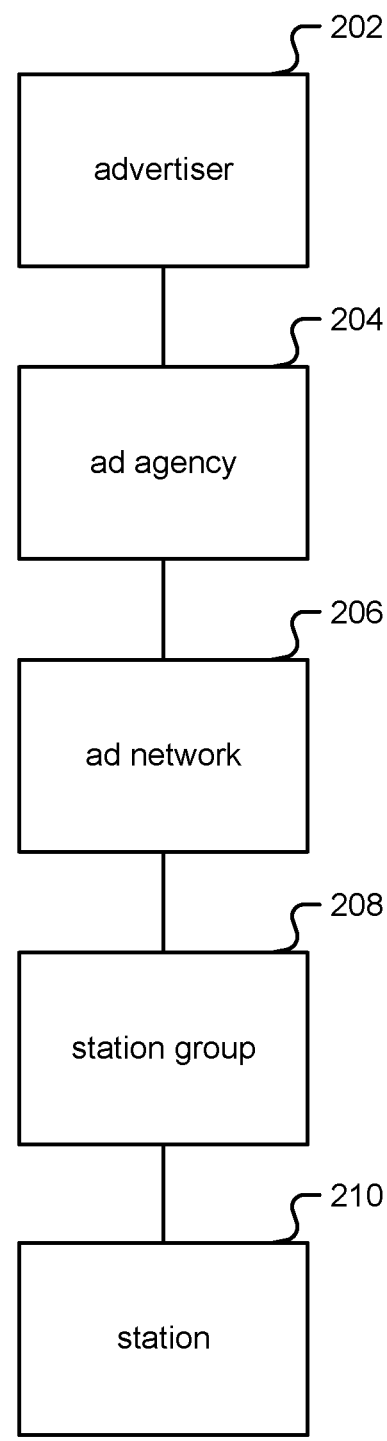
FIG. 2 is a hierarchical diagram illustrating example parties involved in the creation and placement of an ad for broadcast.

Advertising and Broadcast. FIG. 2 is a hierarchical diagram illustrating example parties involved in the creation and placement of an ad for broadcast. A national Advertiser (202) has one or more products, services, and/or messages as advertising on broadcast media. Advertiser (202) retains an ad agency (204) to develop the ad campaign. For the purposes of this specification the ad campaign may be a national campaign or a regional campaign. An ad campaign may include one or more Request For Proposal ("RFP") specifications. An RFP specification may include targeting information, including demographics, markets, market characteristics, weeks, and periods of each week. An RFP specification may also include sizing specifications, including a flexible combination of budget limit, impressions goal, or impressions per price rate limiters. Impressions and/or impacts are a measure of the audience of a station when an ad is broadcast, and are statistically determined by companies such as Arbitron/Nielsen via diary or automated listeners, for example by the hour. An RFP may request impressions in terms of Gross Ratings Points ("GRP"s) in a specific demographic wherein 1 GRP is 1% of the national population within the specific demographic. For example if an ad campaign requests 2 GRPs for women aged 18-45, and it is determined that 65 million women are aged 18-45 nationally, then the ad campaign requests 2% of 65 million or 1.3 million impressions within that demographic.

The ad campaign also comprises one or more ad-creative assets, for example audio creative suitable for a radio ad, video creative suitable for television, and online creative suitable for internet distribution. In some embodiments, advertiser (202) comprises an internal ad agency team (204) within the same corporation.

Ad agency (204) then retains an ad network (206) for publication and/or distribution of the ad campaign. An ad network (206) manages a portion of the placement spots available on multiple broadcast stations (210). Each broadcast station (210) may be independent of the ad network (206) or may be part of the ad network (206). The ad network (206)'s inventory is the collection of placement spots available on the broadcast media of each broadcast station (210). As will be further elaborated, each spot comprises a position, for example a day of week and/or a daypart (for example, 'AM Drivetime', 'lunch', 'PM Drivetime', or 'evening'). Ad network (206)'s inventory may be acquired based on direct affiliation with specific broadcast stations (210) and/or may be acquired based on affiliation with station groups (208) comprising multiple broadcast stations (210).

The Ad Network. Radio stations typically have relatively fixed ad breaks, typically twice per hour. A full break might be 5 minutes long, with 4 minutes of advertising. Stations (210) attempt to fill most of each ad break with local advertisers as these tend to pay substantially more to the station (210) than national-product advertising by advertisers (202). However, stations (210) usually do not have enough demand to fully fill the ad-placement spots they have. These ad spots are thus called a station's inventory. The station (210) will thus contract out a portion of their inventory to an ad network (206). The ad network (206) mediates between a large group of stations (208), (210) and national advertisers (202). An ad network (206) may be necessary because the logistical overhead of advertisers (202) interacting directly with stations (210) would be prohibitive for both stations (210) and advertisers (202).

Figure 3:
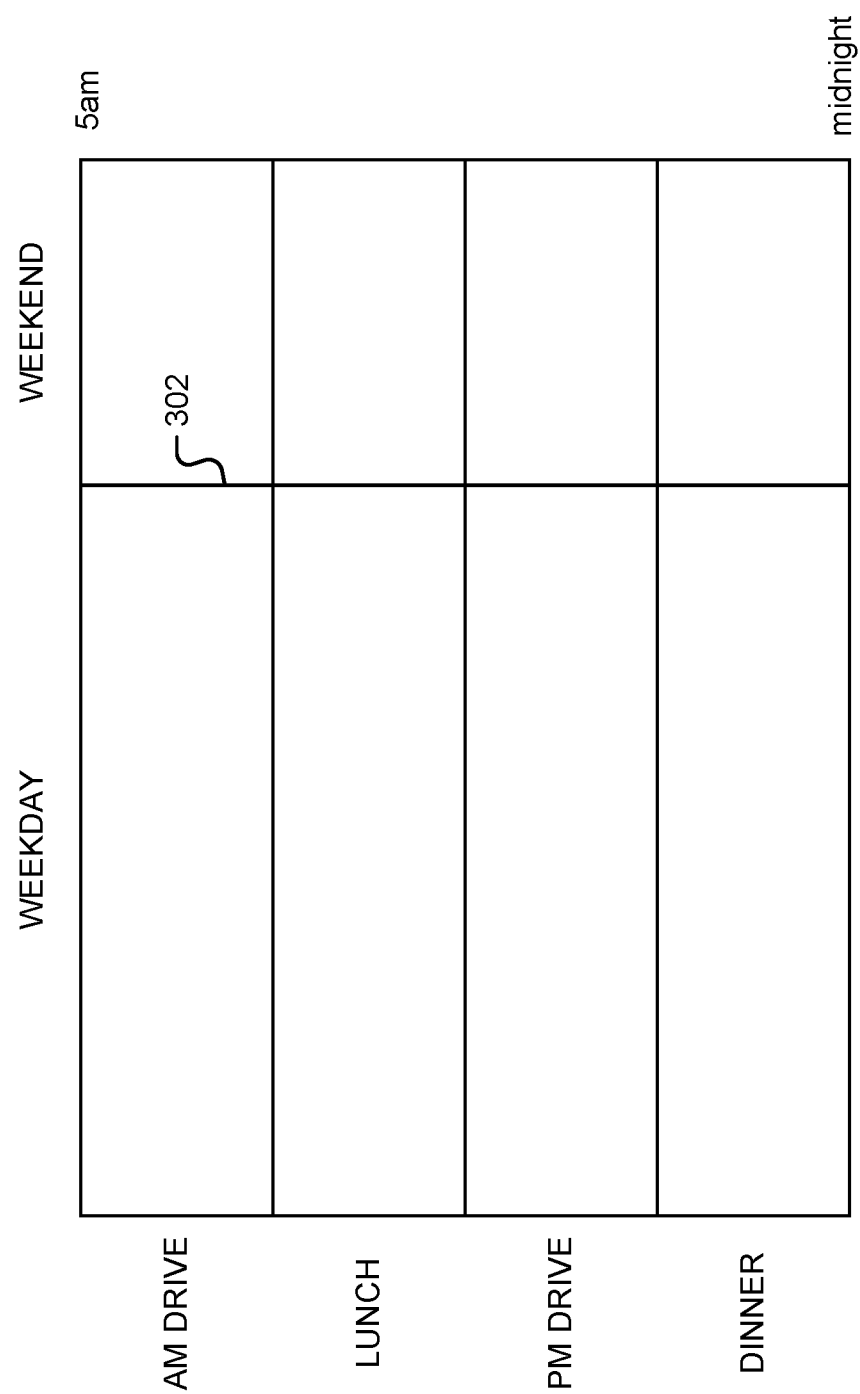
FIG. 3 is an illustration depicting radio broadcast dayparts.

Station Inventory. FIG. 3 is an illustration depicting radio broadcast dayparts. In a radio embodiment, the station (210) typically provides the ad network (206) with inventory for each week, for example twenty-eight pieces of inventory. Each of the seven days of the week has an inventory for four typical dayparts: AM Drive (referring to the morning drive time to work for commuters), Midday, PM Drive (also known as afternoon drive time), and Evening. An inventory is specified by giving the part of the week it covers called a "daypart" (302), the number of ad breaks it contains and the seconds duration each break is to last.

For example, an inventory might cover the "Monday 5 a-10 a" daypart (referring to 5 am to 10 am on Monday), and contain two 60-second breaks. This would indicate that the station agrees to play one minute of the network's ad content (an "ad break" from the network's perspective) at two points during the daypart Monday 5 a-10 a. However, the station (210) does not explicitly state when they will play the breaks, only that they will not play them too close together, for example within 25 minutes of each other. The coarseness of the contract allows the station (210) to retain some flexibility with where it places its network ads, while still allowing the network (206) to place advertisers' ads into the part of the day they desire.

Figure 4:
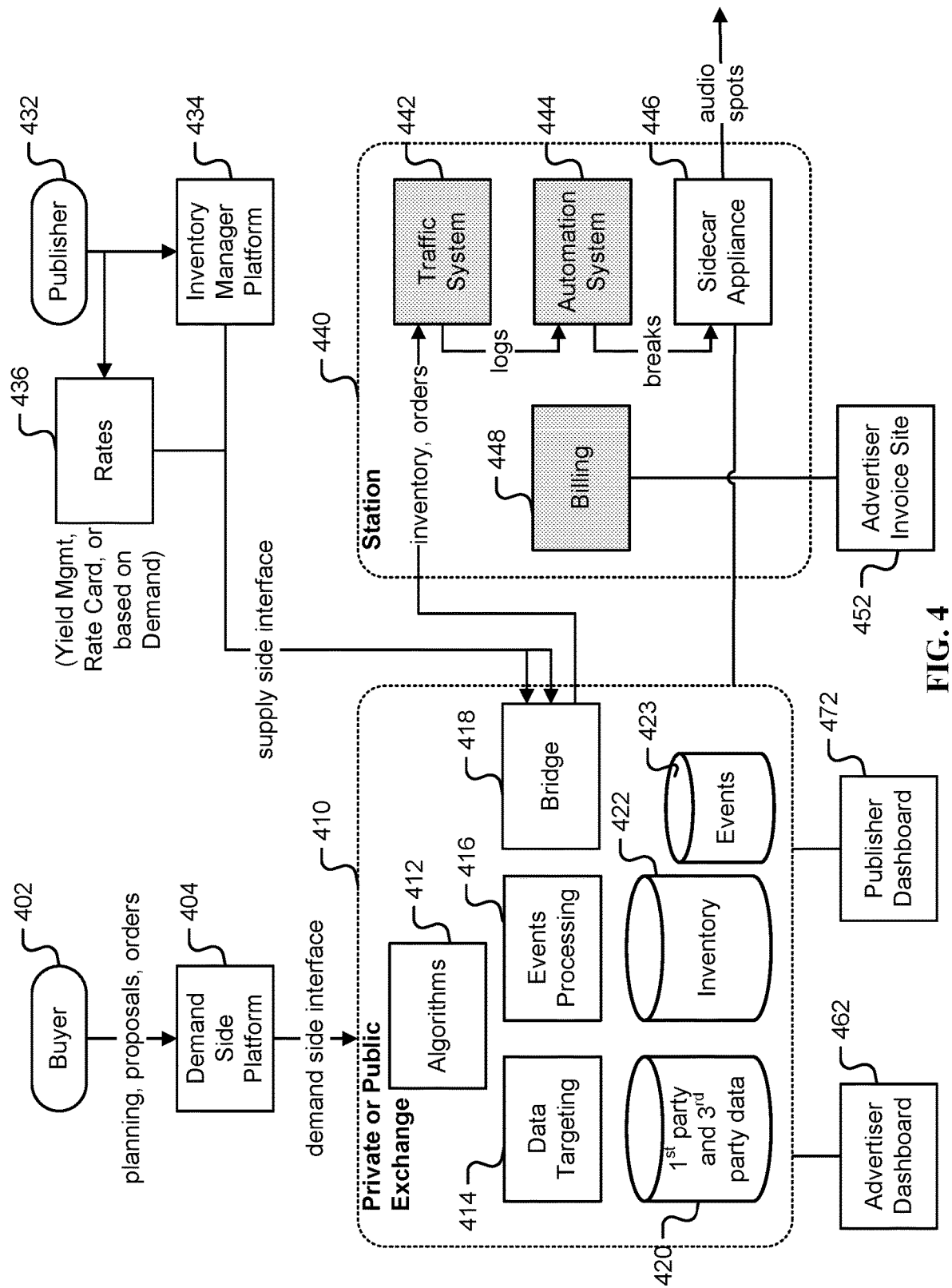
FIG. 4 is a block diagram of an advertising system.

FIG. 4 is a block diagram of an advertising system. In FIG. 4, Buyer (402) represents an advertiser (202), ad agency (204), and/or an ad network (206)/station group (208) assisting an advertiser in purchasing adspace. The Buyer (402) submits campaign planning, proposals and/or orders with a demand side platform (404). Throughout this specification a platform references any programmatic user interface without limitation including a web site, web portal, mobile portal, mobile app, call center and/or computer program. In one embodiment the demand side platform may be represented as two different platforms: a first "self service" platform for an advertiser (202) and/or ad agency (204) to directly interface with, a second for a publisher (206)/(208) to interface buyers through. In both cases, the demand side platform (404) interfaces with ad exchange (410) using a demand side interface, comprising programmatic interfaces such as an application programming interface (API), web service, computer protocol, and other automated and semi-automated interface standards.

Ad exchange (410) comprises algorithms (412), for example algorithms for dynamic lineup and/or placement. Algorithms (412) also may use advance techniques such as data targeting (414) to use first party data such as Nielsen data and/or third party data such as that provided by a publisher (420) to enhance targeting with more precise demographics, and so on. Algorithms (412) also may use events processing (416) with associated events database (423) to enhance delivery by allowing events such as weather events, political events, sports events, and so on to affect delivery and creative selection. The ad exchange (410) may be one or more of: a public ad exchange and a private exchange.

A private exchange (410) is associated with an inventory pool (422) that may be affiliated with a single owned and operated group of stations (210) and sold by the sales channel of that owned and operated group of stations. The ability to purchase on a private exchange usually requires an invitation to the agency (204) or advertiser (202). A public exchange (410) is associated with an inventory pool (422) that is comprised of inventory by a group of stations (210) owned by multiple owners. A public exchange may also require an invitation to agencies (204) and advertisers (202), but in some embodiments may also be completely public and allow any buyer to use a self service demand side platform (404) to purchase inventory from the public exchange (410).

Publisher (432) interfaces with ad exchange (410) using an inventory manager platform (434) to feed inventory (422) in the ad exchange (410). Publisher (432) also provides input in the form of rates (436), whether the rates are based on yield management, a rate card, or an instruction or algorithm to base rates on demand. In one embodiment, the ad exchange (410) takes an instruction/algorithm to base rates on demand and manifests it using algorithms (412) to provide a dynamic and/or responsive rate. The publisher (432) using the inventory manager platform and inputs rates to a bridge (418) on the ad exchange (410) using a supply side interface, comprising programmatic interfaces such as an API, web service, computer protocol, and other automated and semi-automated interface standards.

A station (440) affiliated with publisher (432) comprises preexisting systems, shown in FIG. 4 as grey blocks: traffic system (442) which produces logs for automation system (444), and billing (448) which invoices to an advertiser invoice site (452) for campaigns associated with ad exchange (410). The traffic system (442) interfaces with bridge (418) for generic inventory and orders: in one embodiment, the traffic system is given the number of breaks, the length of breaks (e.g. 30s or 60s), and an identifier to associate the order with a programmatic ad network (206) that is associated with ad exchange (410).

Automation system (444) then signals breaks to sidecar appliance (446), which is coupled with the ad exchange and submits audio spots directly for listening. Exchange (410) using the information from sidecar appliance (446) is coupled with an advertiser dashboard (462) for reporting, accounting, and QA to advertiser/buyer (402), and likewise coupled with a publisher dashboard (472) for reporting, accounting, and QA to publisher (432).

In the example shown in FIG. 4, the publisher (432) is associated with a linear broadcast station (440). Without limitation, a publisher (432) may be associated instead with an online streaming service, such as iTunes or Spotify. In this case, the online streaming service does not have a sidecar appliance (446) but instead a "sidecar API" to allow exchange (410) to interject the ad spot at the appropriate time.

In the example shown in FIG. 4, one or more events data sources (not shown) may be coupled to events processing (416) in the exchange (410). For example, a weather data source may be coupled to events processing (416) over a network and/or cloud connection, for example the internet, via one or more APIs. Both event data sources and events are stored in databases, for example a events database (423). In one embodiment, a "time to live" (TTL) and/or timeout is established for an events data source, established by the events data source itself and/or by events processing (416).

Weather Example. Without limitation, the example of weather events is given below for illustrative purposes. Any person having ordinary skill in the art may extend the techniques disclosed without limitation to other event types/triggers including political event triggers, sports event triggers, news event triggers, sales volume triggers, audience response triggers, entertainment event triggers, traffic event triggers, and holiday/seasonal event triggers.

In one embodiment, the events processing (416) may offer two API endpoints for the events data source: an Event Rules API to fetch all available event rules and possible values; and a Current Values API to fetch current values for all locations and/or markets given event rules. For the example of weather, possible assumptions include:

- The number of weather rules may change over time, increasing and decreasing;
- The number and specific values for a given weather rule may not change once it is finalized prior to ad campaign start;
- The DSP (404) and/or exchange (410) may poll a weather data source on a daily basis for the Rules API;
- The weather rules that come in response via the Rules API may be populated in a drop down menu or other UI technique during campaign creation to allow traffickers to select from the available copy rotation rules;
- The weather value that is presented for a given market and time may change as frequently as every 15 minutes, for example precipitation as opposed to sunrise/sunset times as every 1 day, in which case the exchange (410) and/or DSP (404) polls for the latest value to make better ad creative selection; and
- The finest granularity for a weather rule value may be DMA/MSA.

In one embodiment, when a weather data source builds a new weather segment and/or weather rule, it may be presented within the DSP (404) user interface so that buyers (202/204) may select the rule and its associated values.

In one embodiment, the weather datasets is presented as basic numerical values, such as the current temperature, or is pre-summarized into categorical values, such as "hot", "warm", and "cool". The weather dataset may have a static set of categorical values, or the categories may be subject to change over time. Each advertiser (202/204) may customize the categories to suit their product. For example, they may consider 50 to 65 degrees to be "cool" for their product's purposes. The weather provider or the advertiser may also customize how the categories are formed to match the prevailing weather in the city; what's "cool" in San Diego may be "hot" in Toronto.

In one embodiment, forming categories from numerical data is a key to increasing usability of the rule-creation process. One reason is that categories serve as a foundation for logical rules to be built on. For example, a rule might be "If it's raining and not windy or it's hot and sunny, sell umbrellas.", while another rule might be "If it's raining and it's windy, sell ponchos.". It may be easier to capture the user's business intent/logic with well-formed categories already created for them. That benefit is enhanced by pre-customizing the categories to the product and the prevailing conditions in the city.

In one embodiment, translation of marketing objectives to a preexisting weather rule or a customized weather rule may occur using natural language processing or manual intervention. As with other copy rotation rules, a user may be able to change copy creative against a weather rule even after the ad campaign starts.

Weather Example—User Scenarios.

In one embodiment, to control which ads play, or when a campaign is run, the user may first create situation rules, sometimes called "data rules", that are boolean statements formed from one or more events. The events used are category values, such as "hot". The events used may come from a single dataset or from multiple ones. For example, the temperature may be one dataset, while the wind speed is a separate one. To make the process cognitively simple for the user (202/204), they are free to create multiple rules that might logically overlap each other; overlaps are resolved by picking the first matching rule, given the precedence order the user left the rules in.

In one embodiment, a key technique to keep cognitive complexity down is to allow for various types of default ad rotations. In this way, the user (202/204) does not need to keep track of logical gaps in the rules they explicitly set up. If there is a situation their rules do not cover, control may fall back to the appropriate default. Note that the process of forming a situation/data rule may be separate from the process of creating the ad rotations to associate with the rule; for non-event-based campaigns, ad rotations are associated directly with the campaign, without the need to create a situation to bind them to.

Adding an event rule. FIGS. 5A-5I are user interface screenshots illustrating a storyboard for creating or adding an event rule. In one embodiment, the storyboard of FIG. 5A-5I are what a user (202/204) of a DSP (404) might view.

Figure 5A:
Figure 5B:
Figure 5C:
Figure 5D:
Figures 5E, 5F:
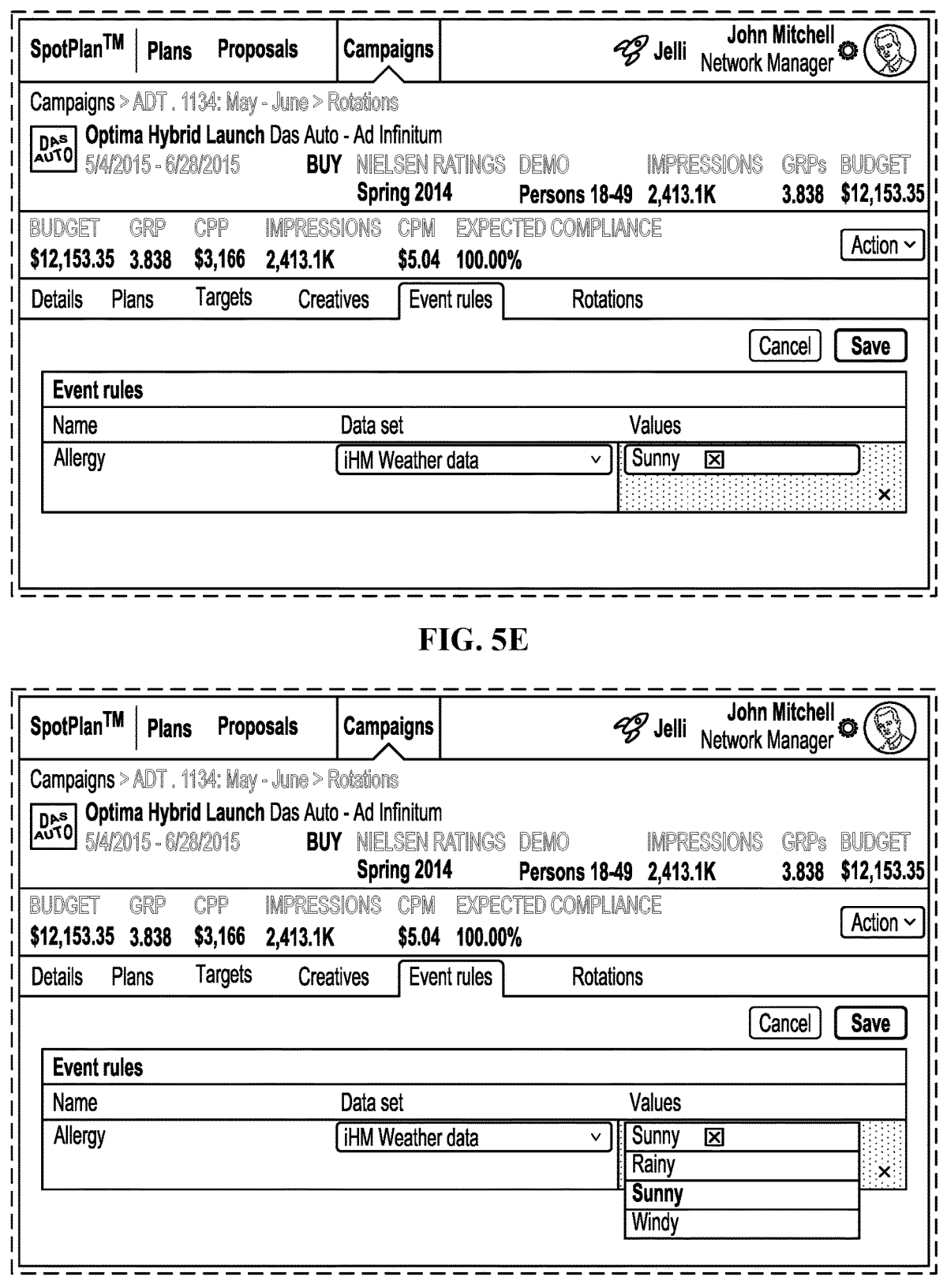

A typical flow for adding an event rule includes at least one of the following steps: a user (202/204) opens the DSP (404) tool; the user asserts a "campaigns" tab or section; the user asserts a "events" tab or subsection, as shown in FIG. 5A. The user may then add new event rules as shown in FIG. 5B, including at least one of the following: name of rule, for example "Allergy" in FIG. 5C; a data set, for example "Weather Data" in FIG. 5D; a set of rule values, for example "Sunny" in FIG. 5E, wherein multiple values may be selected, for example Weather Data matching Sunny, "Rainy", and/or "Windy" in FIG. 5F; and multiple data sets may also be selected, for example Weather Data matching 'Sunny or Windy' and "Pollen Count Data" matching a second condition, "High Count", in FIG. 5G. In summary, multiple values may be selected for a data sets using Boolean logic between values, and multiple datasets may be selected using Boolean logic between datasets. Certain rules and/or rule names may be disallowed if it conflicts with reserved names and/or a reserved catch all rule, for example "All other" for a rule name in FIG. 5I.

Figure 6A:
FIGS. 6A-6B are user interface screenshots illustrating a storyboard for editing an event rule.
Figure 6B:

Editing an event rule. FIGS. 6A-6B are user interface screenshots illustrating a storyboard for editing an event rule. In one embodiment, the storyboard of FIG. 6A-6B are what a user (202/204) of a DSP (404) might view.

A typical flow for adding an event rule includes at least one of the following steps: a user (202/204) opens the DSP (404) tool; the user asserts a "campaigns" tab or section; the user asserts a "events" tab or subsection to view existing rules for editing, as shown in FIG. 6A. In one embodiment, before a campaign launches, all rules are editable since the campaign has not begun, as shown in FIG. 6A. In one embodiment, after a campaign launches, existing rules are no longer editable, but new ones may be added, as shown in FIG. 6B.

Figure 7A:
FIGS. 7A-7U are user interface screenshots illustrating a storyboard for using event rules in rotations.

Using event rules in rotations. FIGS. 7A-7U are user interface screenshots illustrating a storyboard for using event rules in rotations. In one embodiment, the storyboard of FIG. 7A-7U are what a user (202/204) of a DSP (404) might view.

Figure 7B:
Figure 7E:
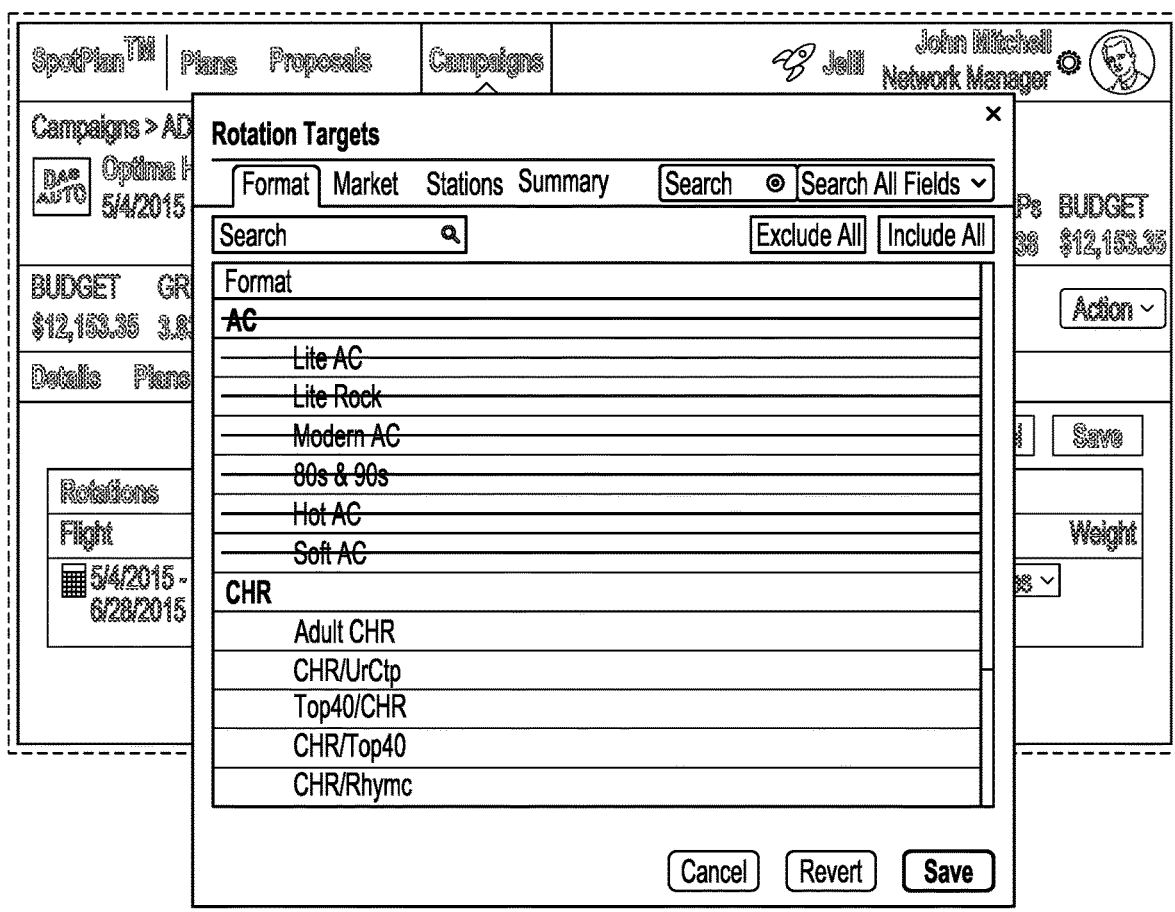
Figure 7F:

A typical flow for adding an event rule includes at least one of the following steps: a user (202/204) opens the DSP (404) tool; the user asserts a "campaigns" tab or section; the user asserts a "rotations" tab or subsection to view existing rules for editing, as shown in FIG. 7A in the example when no event rules are in the campaign. In the rotations subsection a user (202/204) may input flights (which weeks in the campaign), locations, and dayparts, and input multiple event rules. The user then may associate ad creative with each rule. An example showing the creation of a rotation is shown in FIG. 7B. The user picks a flight date as shown in FIG. 7C, and then picks stations by market. In FIG. 7D, the user is shown markets in the associated plans, and in FIG. 7E, the user picks stations by format. A user may pick by stations, as shown in FIG. 7F. In one embodiment, if a station is included because of it associated market or associated format and is then deselected from the stations subsection, then the appropriate market and/or format may be unselected.

Figure 7G:
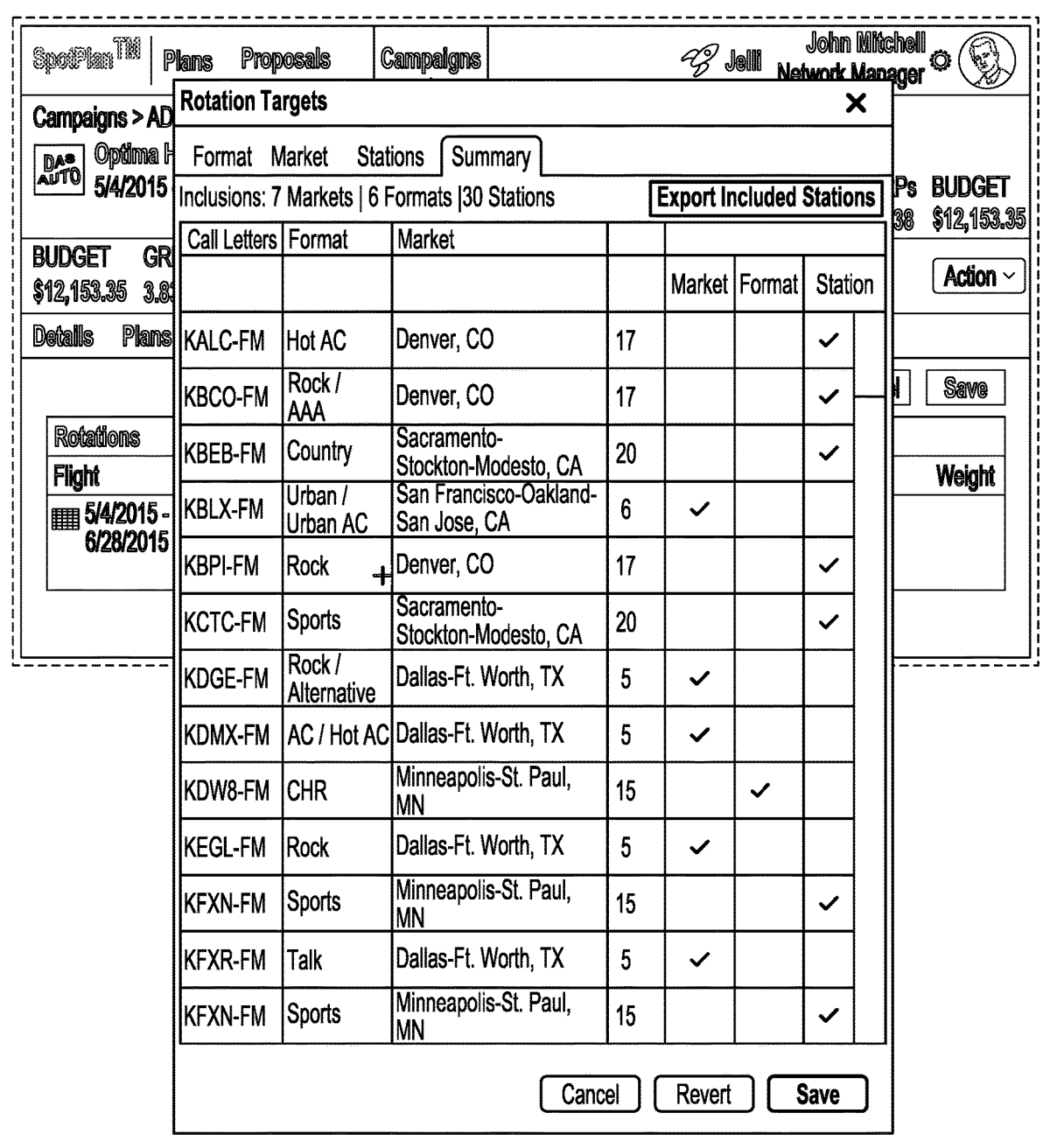
Figures 7H, 7I:
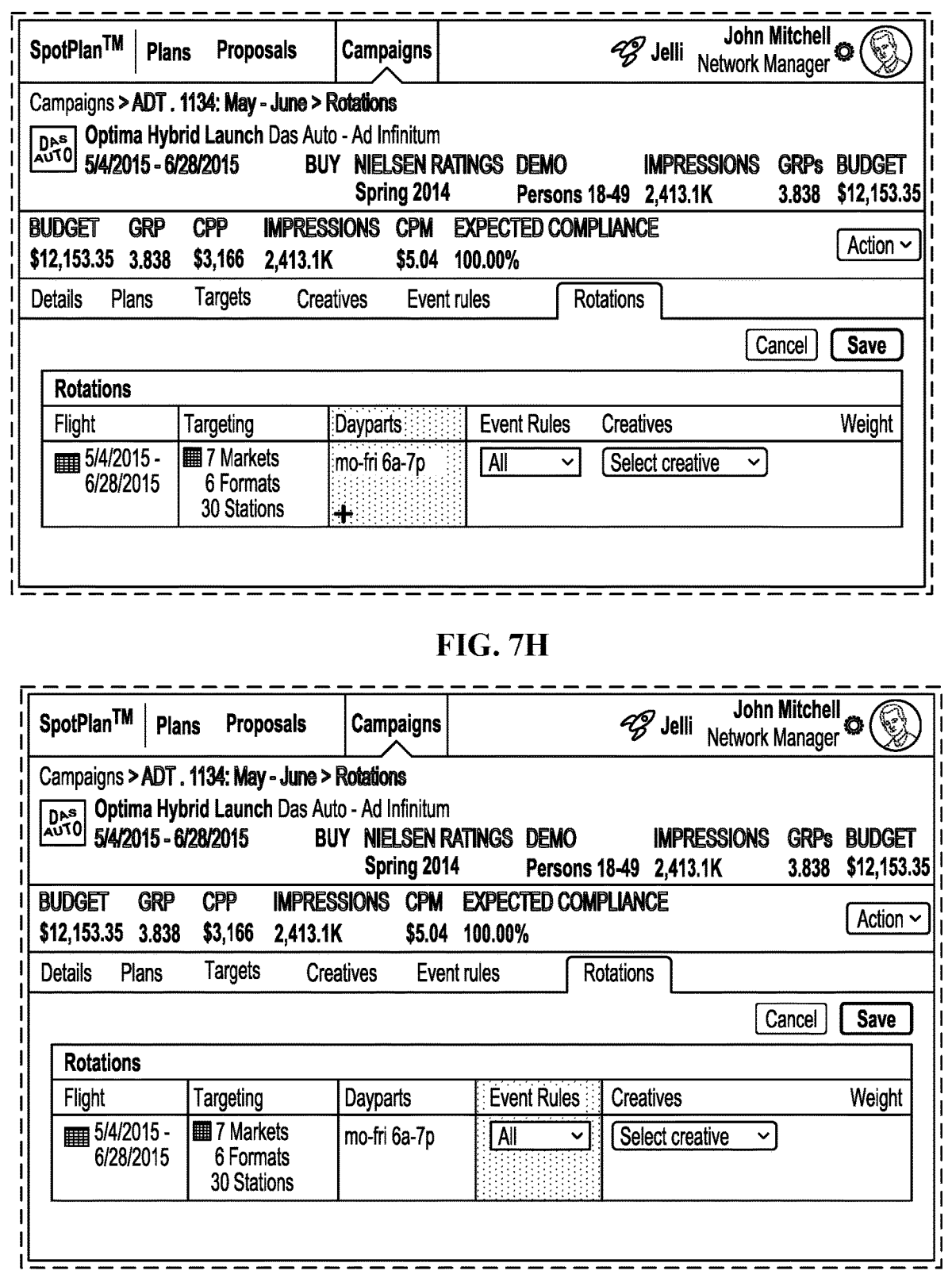

In one embodiment, a summary of all inclusions along with an export of included stations is shown in FIG. 7G. The user picks dayparts as shown in FIG. 7H, and then picks event rules as shown in FIG. 7I. In the example in FIG. 7J, the user picks the Allergy event rule. In the example in FIG. 7K, the user adds the "All other" event rule as the catch all rule. In one embodiment, a new event rule may be added by selecting event rule from "All other". In one embodiment, event rules other than "All other" may be ordered by for example dragging and dropping them in the appropriate ordering, as shown in FIG. 7L wherein the Cold Season event rule is dropped between the Allergy event rule and the "All other" event rule. In one embodiment, one or more creative may be added under an event rule, as shown in FIG. 7M, wherein DATO68995 and DATO68997 are both added under the Allergy event rule.

Figures 7O, 7P:
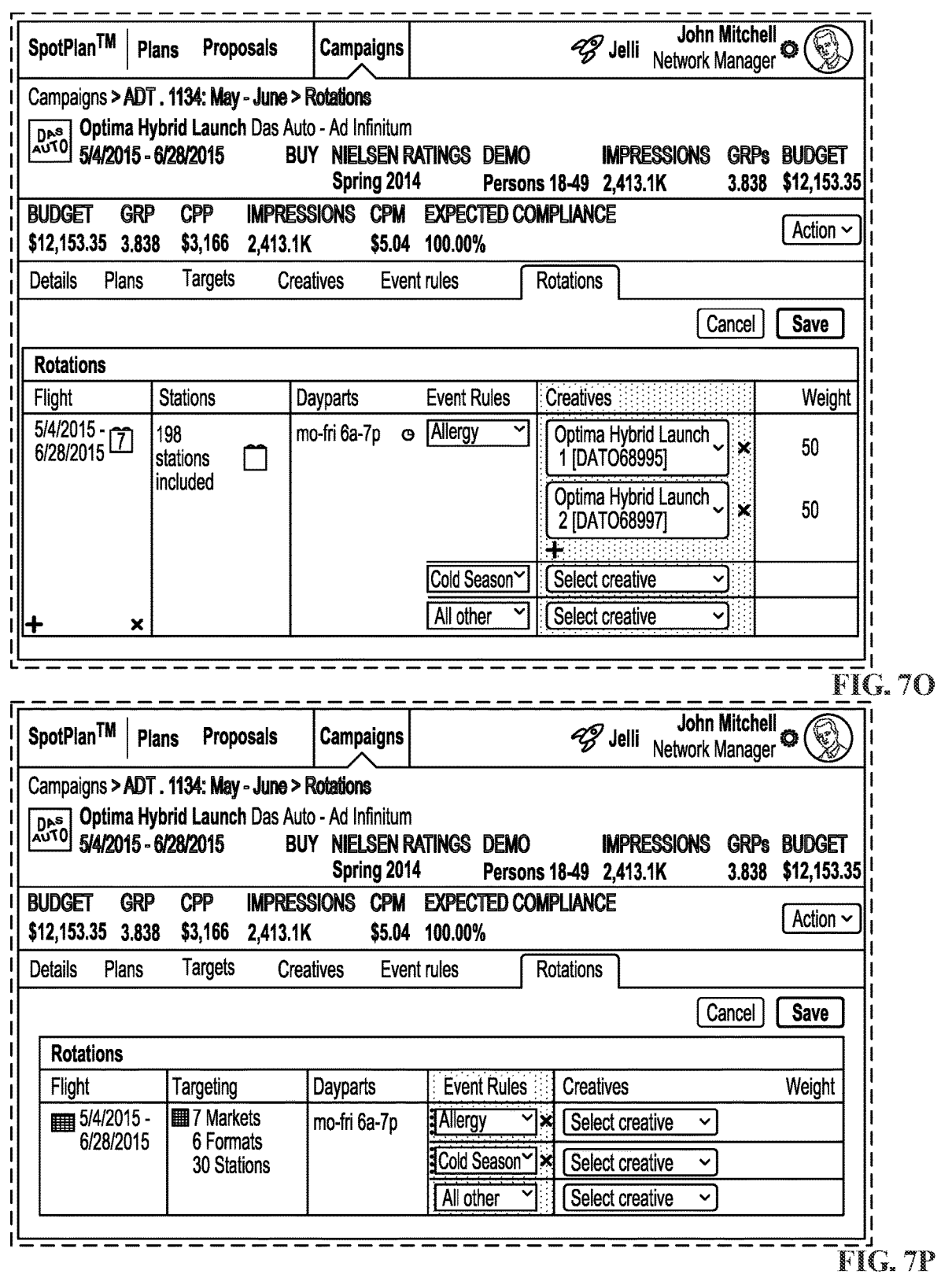

In one embodiment, a flight may be removed entirely, including stations may be removed, daypart may be removed, event rules may be removed, and creative may be removed. For example, in FIG. 7N the user may click on the X to remove the flight, in FIG. 7O the user may click on the one or two X's to remove one or both of the creatives, and in FIG. 7P the user may click on the appropriate X to remove an event rule.

Figure 7S:
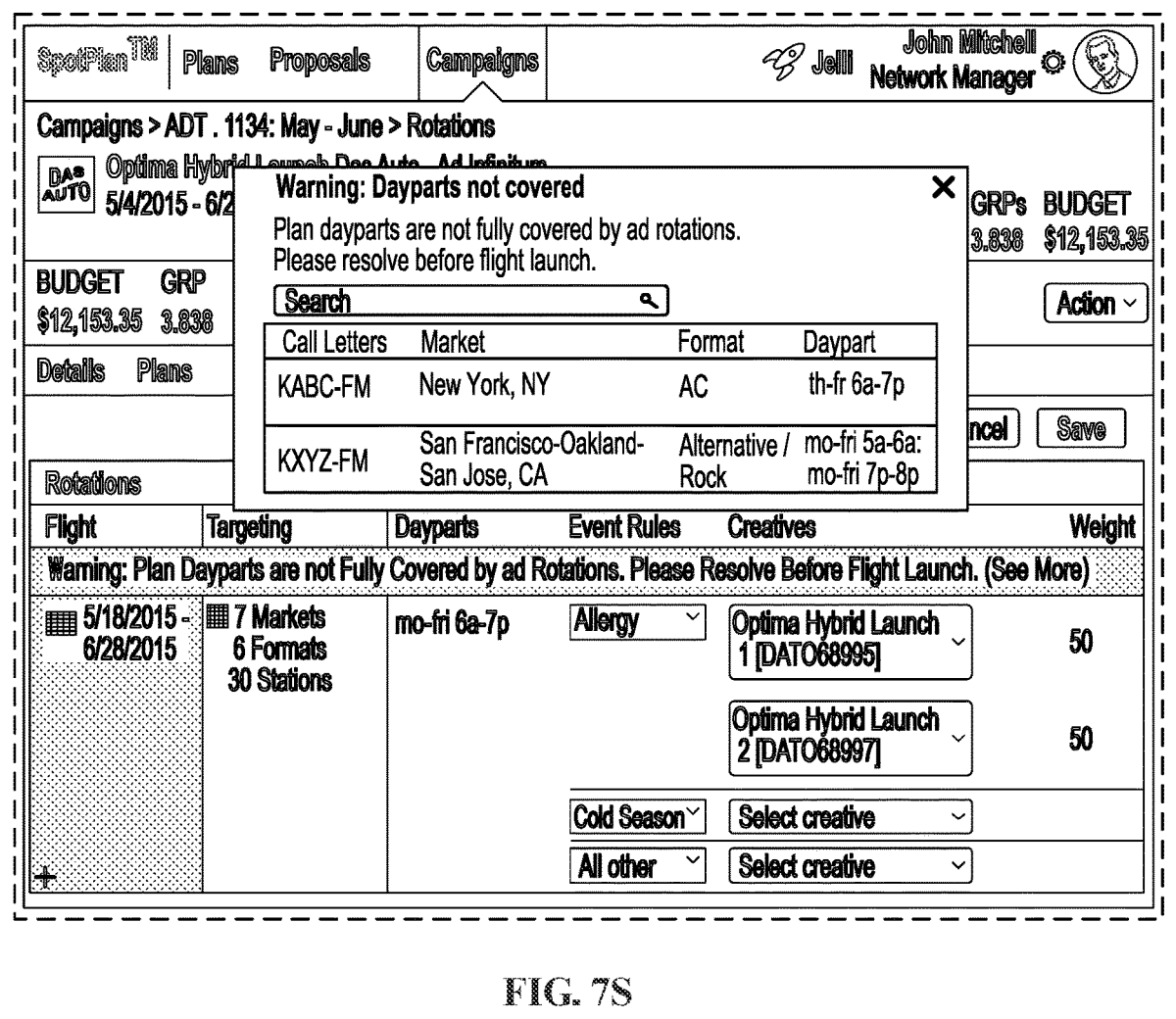

In one embodiment, warning conditions warn the user for example if a rotation change is being made to a live campaign as shown in FIG. 7Q. Another warning condition is when not all stations and dayparts are covered, as shown in FIG. 7R with two stations with no ad rotations, where when the user assets "see more" they see FIG. 7S. Another possible warning condition is when plan dayparts on certain stations are not fully covered by ad rotations.

Figure 7T:
Figure 7U:
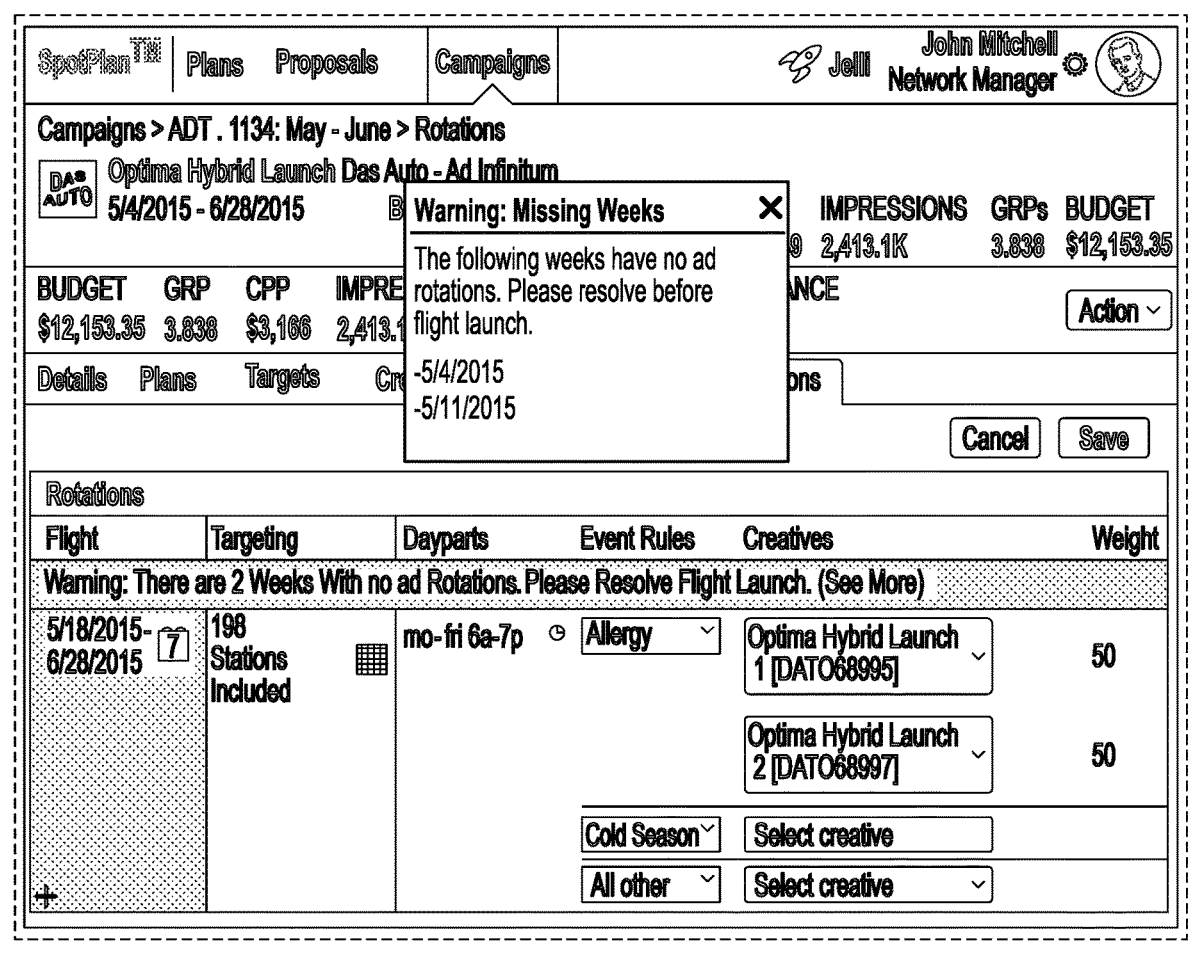

Another warning condition is when not all flight weeks are covered, as shown in FIG. 7T with two weeks with no ad rotations, where when the user asserts "see more" they see FIG. 7U.

Figures 8C, 9:
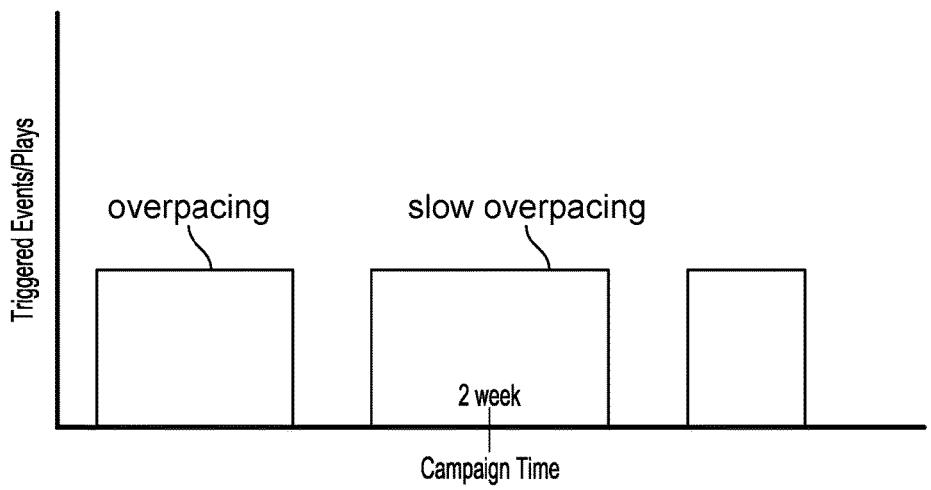

Reporting on Events. FIGS. 8A-8C are user interface screenshots illustrating a storyboard for reporting an event. In one embodiment, the storyboard of FIG. 8A-8C are what a user (202/204) of a DSP (404) might view.

A typical flow for reporting on events includes at least one of the following steps: a user (202/204) opens the DSP (404) tool; the user asserts a "reporting" tab or section; and the user asserts a campaign in the reporting section, as shown in FIG. 8A, wherein an impressions by event is displayed; in the example in FIG. 8A, Allergy has 9.2%, Cold Season has 72.5% and All other has 18.3%. In one embodiment, impressions may be grouped and/or filtered by event, for example by asserting "show events" under "impressions by event".

In one embodiment, the report also permits user (202/204) to assert "show ad plays" as shown in FIG. 8A, to display a play log with event tags as shown in FIG. 8B. In the example of FIG. 8B, the first play of the play log was on Sunday Sep. 27, 2015 at 6:43 PM US/Hawaii wherein the event was Allergy, and so forth. In one embodiment, the play log report also permits user (202/204) to assert "show event rules", to display rule definitions, as shown in FIG. 8C.

FIG. 9 is an illustration of events pacing. In one embodiment, events processing (416) in FIG. 4 monitors events pacing. In the example shown, a buyer indicates that for a given campaign 400 event based plays should occur in four weeks, for example 400 plays of an umbrella ad when it is rainy.

In one embodiment, the events data source provides forecasts in the future to permit campaign planning. For example, a weather data source estimates 75 hours of rain in the next three days in multiple cities in a campaign DMA. The weather data source also provides an error in the prediction, for example a standard deviation of +/−5 hours. In one embodiment, events processing (416) performs its own estimate/forecast and error. Pacing in events processing (416) uses the forecasts to adjust play frequency, for example the minimum period between event triggers and the corresponding action of a play. In one embodiment, pacing is set to overpace and/or over deliver on event plays, if that is more acceptable to buyer (202/204). In one embodiment, pacing is adjusted with an Adaptive Cut-off technique to moderate pacing nearer the end of the campaign when there are fewer forecasts and/or lower error.

Figures 5G, 5H:
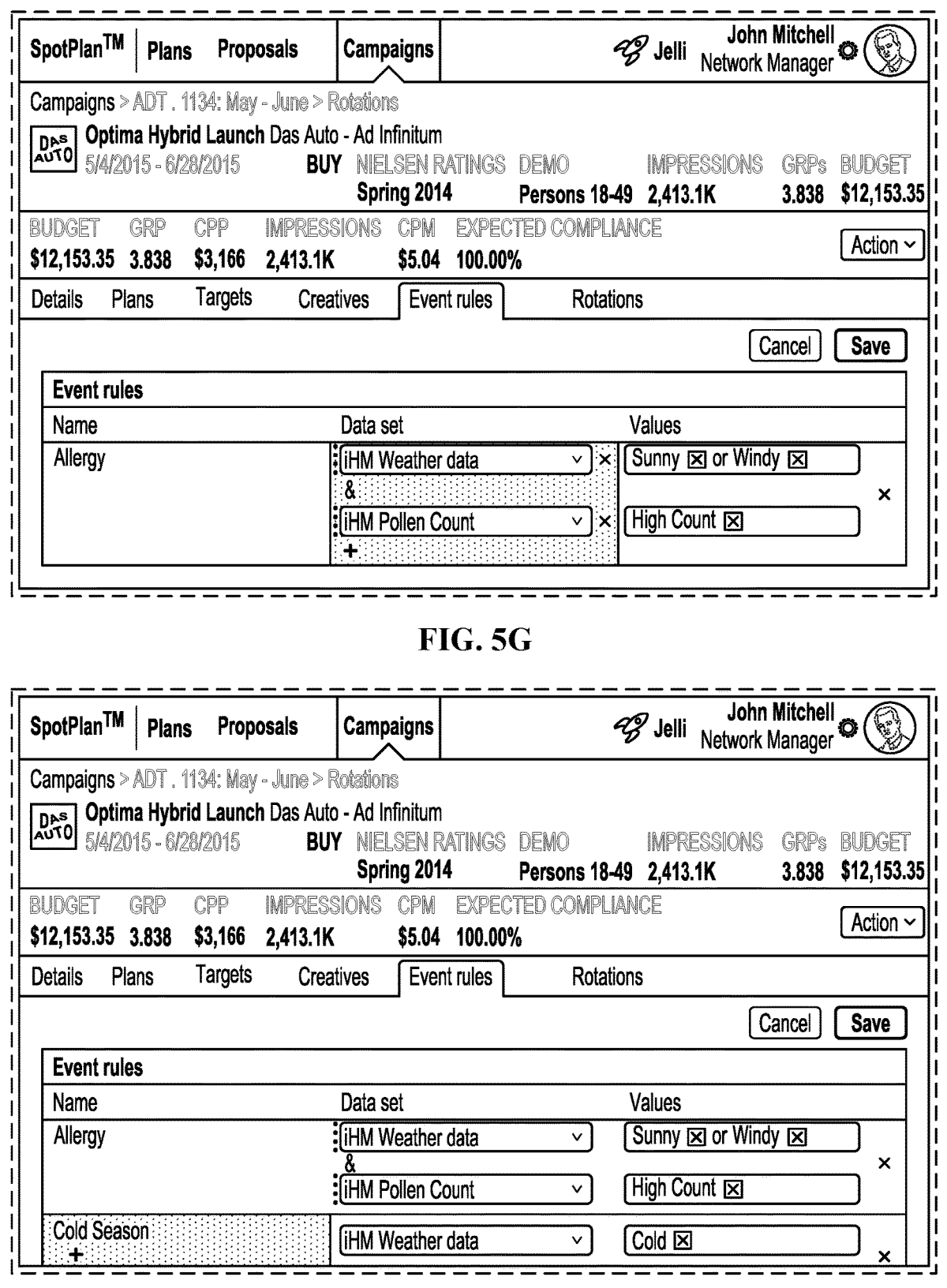
Figure 5I:
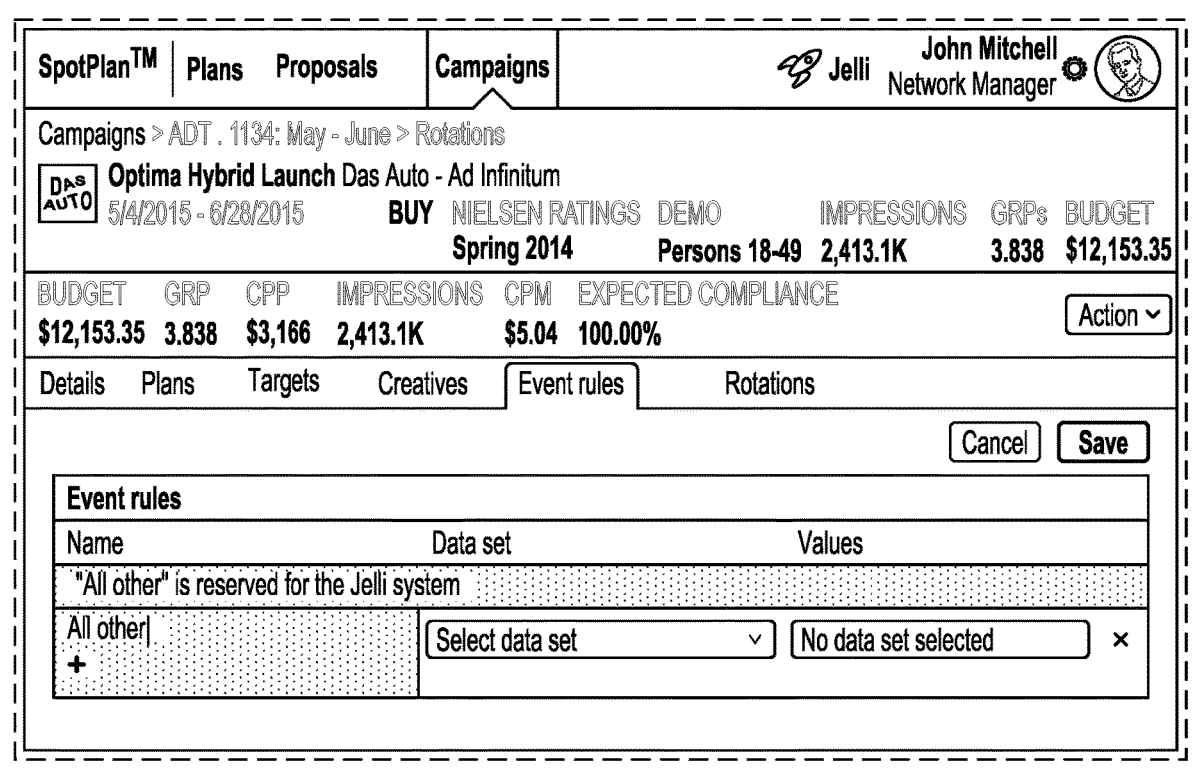
Figure 10:
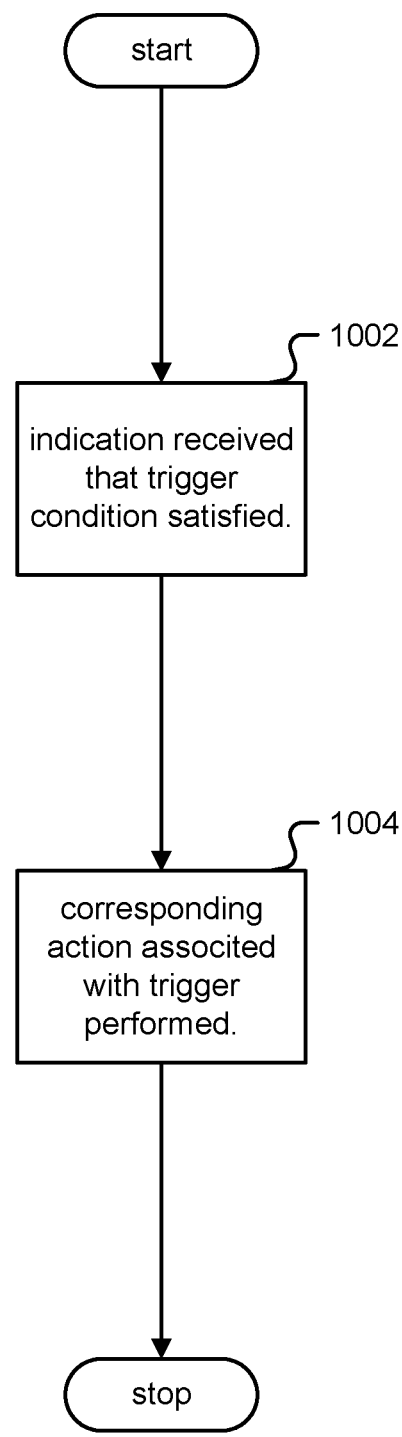
FIG. 10 is an illustration of a flow chart for event triggering.

FIG. 10 is an illustration of a flow chart for event triggering. In one embodiment, the process of FIG. 7 is carried out by events processing (416) in FIG. 4. In one embodiment, a data storage device (423) associated with events processing (416) in FIG. 4 is configured to store one or more event trigger rules, each event trigger rule including a trigger condition and a corresponding action. An example of an event trigger rule is shown in FIG. 5G as the Allergy trigger rule, where the trigger condition is if weather data indicates sunny or windy, and pollen count data indicates a high count. An example of a corresponding action is shown in FIG. 7M, wherein for a flight, in this case between May 4, 2015 and Jun. 28, 2015, for 7 markets, 6 formats, and 30 stations, during a daypart, in this case daypart mon-fri 6 am-7 pm, if Allergy is triggered, then creative DATO68995 and DATO68997 may be used for play with equal (50%) weighting.

In step 1002, an indication is received that a trigger condition associated with a triggered event trigger rule has been satisfied. In step 1004, the corresponding action associated with the triggered event trigger rule is performed, based at least in part on the indication, wherein the corresponding action comprises a behavior associated with an audio advertising campaign as shown in FIGS. 5 and 7.

In one embodiment, the trigger condition is an occurrence of an event, as given in the weather data source examples above. Events may also be sources like a political data source that communicates poll results based on a federal election to events processing (416) along with error statistics. In one embodiment, event data is received and stored to an events database (423) associated with events processing (416). In this case, a Republican majority poll result may be associated with corresponding action comprising a creative for Republicans, wherein a Democrat majority poll result may be associated with corresponding action comprising a creative for Democrats, or vice versa. Thus, the corresponding action comprises targeting an audience or avoiding an audience, based on occurrence of the event. Events may also be sources like a sales data source that communicates aggregate sales subtotals based on point of sale devices to events processing (416) along with error statistics.

In one embodiment, the event is at least one of the following: a weather event, a sports event, a political event, an entertainment event, a news event, an event based on impressions of ads, an event based on activation of ads, and an event based on sales data. In one embodiment, the trigger condition comprises a TTL duration associated with the trigger condition.

In one embodiment, the corresponding action comprises at least one of the following: which ad spot is be run, whether an ad campaign is to be played, and a change to a pacing of ad spots. In one embodiment, the trigger condition comprises that frequently triggered rules results in a slower pacing of future ad spots, as described in FIG. 9. In one embodiment, the trigger condition comprises a pacing of ad spots. In one embodiment, the pacing includes an over-allocation with adaptive cut-off algorithm based at least in part on the error between a forecast and an actual series of events. In one embodiment, the over-allocation with adaptive cut-off algorithm comprises an overpacing mechanism to overdeliver ad spots.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a linear broadcasting radio station configured to broadcast an audio advertising campaign;
a data storage device configured to:
store one or more event trigger rules, each event trigger rule including a trigger condition and a corresponding action, wherein the one or more event trigger rules comprises a regional sales event trigger rule including a given trigger condition based at least in part on a regional sales level and a given corresponding action of reducing delivery of a regional sales audio advertising campaign via a sidecar appliance at the linear broadcasting radio station, wherein the trigger condition as stored has been adjusted to over-allocate a pacing of ad spots based on an error bar between a prediction of event results and actual event results, wherein the over-allocating of the pacing includes sending a signal to the sidecar appliance to submit the ad spots; and
a processor coupled to the data storage device and configured to:
fetch current values related to the one or more event trigger rules using an application program interface;
receive, based on the fetched current values, an indication that the trigger condition associated with a triggered event trigger rule has been satisfied; and
perform the corresponding action associated with the triggered event trigger rule, based at least in part on the indication, wherein the corresponding action comprises a behavior associated with the audio advertising campaign, wherein the performing of the corresponding action comprises to:
determine whether a number of impressions of the audio advertising campaign has reached an impression goal; and
in response to a determination that the number of impressions satisfies the impression goal:
remove, using an inventory application programming interface, any remaining allocation of ad spots associated with the audio advertising campaign; and
cease, using the inventory application programming interface, playing an ad spot associated with the audio advertising campaign.

2. The system of claim 1, wherein the trigger condition is an occurrence of an event.

3. The system of claim 2, further comprising a communication interface coupled to the processor, wherein the communication interface is configured to:
receive an event data; and
store the event data to an event database.

4. The system of claim 2, wherein the event is at least one of the following: a weather event, a sports event, a political event, an entertainment event, a news event, an event based on impressions of ads, an event based on activation of ads, and an event based on sales data.

5. The system of claim 1, wherein the trigger condition comprises a TTL duration associated with the trigger condition.

6. The system of claim 1, wherein the corresponding action comprises at least one of the following: which ad spot is be run, whether the audio advertising campaign is to be played, and a change to a pacing of ad spots.

7. The system of claim 1, wherein the trigger condition comprises that frequently triggered rules results in a slower pacing of future ad spots.

8. The system of claim 1, wherein the corresponding action comprises targeting an audience or avoiding an audience, based on occurrence of the event.

9. The system of claim 1, wherein receiving the indication comprises using a situational sales stabilization algorithm to use a closed-loop feedback source as an event trigger.

10. The system of claim 9, wherein the closed-loop feedback source includes at least one of the following: a political campaign, a sales volume, a sales metric, an advertising response metric, an impressions count, an activation count, a direct poll of product awareness, and a proxy measure of product awareness.

11. The system of claim 1, further comprising resolving logically overlapping event trigger rules using a user precedence order.

12. The system of claim 1, wherein the corresponding action is a default ad rotation.

13. A method, comprising:
broadcasting, using a linear broadcasting radio station, an audio advertising campaign;
storing one or more event trigger rules, each event trigger rule including a trigger condition and a corresponding action, wherein the one or more event trigger rules comprises a regional sales event trigger rule including a given trigger condition based at least in part on a regional sales level and a given corresponding action of reducing delivery of a regional sales audio advertising campaign via a sidecar appliance at the linear broadcasting radio station, wherein the trigger condition as stored has been adjusted to over-allocate a pacing of ad spots based on an error bar between a prediction of event results and actual event results, wherein the over-allocating of the pacing includes sending a signal to the sidecar appliance to submit the ad spots;
fetching current values related to the one or more event trigger rules using an application program interface;
receiving, based on the fetched current values, an indication that the trigger condition associated with a triggered event trigger rule has been satisfied; and
performing the corresponding action associated with the triggered event trigger rule, based at least in part on the indication, wherein the corresponding action comprises a behavior associated with the audio advertising campaign, wherein the performing of the corresponding action comprises:
determining whether a number of impressions of the audio advertising campaign has reached an impression goal; and
in response to a determination that the number of impressions satisfies the impression goal:
removing, using an inventory application programming interface, any remaining allocation of ad spots associated with the audio advertising campaign; and
ceasing, using the inventory application programming interface, to play an ad spot associated with the audio advertising campaign.

14. The method of claim 13, wherein the trigger condition is an occurrence of an event.

15. A computer program product, the computer program product being embodied in a non-transitory computer readable storage medium and comprising computer instructions for:
broadcasting, using a linear broadcasting radio station, an audio advertising campaign;
storing one or more event trigger rules, each event trigger rule including a trigger condition and a corresponding action;
wherein the one or more event trigger rules comprises a regional sales event trigger rule including a given trigger condition based at least in part on a regional sales level and a given corresponding action of reducing delivery of a regional sales audio advertising campaign via a sidecar appliance at the linear broadcasting radio station, wherein the trigger condition as stored has been adjusted to over-allocate a pacing of ad spots based on an error bar between a prediction of event results and actual event results, wherein the over-allocating of the pacing includes sending a signal to the sidecar appliance to submit the ad spots;
fetching current values related to the one or more event trigger rules using an application program interface;
receiving, based on the fetched current values, an indication that the trigger condition associated with a triggered event trigger rule has been satisfied; and
performing the corresponding action associated with the triggered event trigger rule, based at least in part on the indication, wherein the corresponding action comprises a behavior associated with the audio advertising campaign, wherein the performing of the corresponding action comprises:
determining whether a number of impressions of the audio advertising campaign has reached an impression goal; and
in response to a determination that the number of impressions satisfies the impression goal:
removing, using an inventory application programming interface, any remaining allocation of ad spots associated with the audio advertising campaign; and
ceasing, using the inventory application programming interface, to play an ad spot associated with the audio advertising campaign.

16. The computer program product of claim 15, wherein the trigger condition is an occurrence of an event.

* * * * *